United States Patent [19]
Bambacigno et al.

[11] Patent Number: 5,234,191
[45] Date of Patent: Aug. 10, 1993

[54] APPARATUS FOR FORMING A FLUID CONTAINMENT VAULT

[75] Inventors: Ralph Bambacigno, Modesto; Thomas R. Lindquist, Denair, both of Calif.

[73] Assignee: Convault, Inc., Denair, Calif.

[21] Appl. No.: 692,099

[22] Filed: Apr. 26, 1991

Related U.S. Application Data

[60] Continuation-in-part of Ser. No. 541,004, Jun. 20, 1990, abandoned, which is a continuation-in-part of Ser. No. 298,548, Mar. 9, 1989, Pat. No. 4,963,082, which is a division of Ser. No. 118,919, Nov. 16, 1987, Pat. No. 4,826,644, which is a continuation-in-part of Ser. No. 936,205, Dec. 1, 1986, abandoned.

[51] Int. Cl.$^5$ .................... B29C 39/10; B29C 39/22
[52] U.S. Cl. .................... 249/93; 249/219.1; 264/35; 425/125
[58] Field of Search .......... 425/125, DIG. 48, 117, 425/396, 411; 249/93, 219.1, 91, 121; 403/68, 70, 71, 161, 362; 264/275, 278, 35

[56] References Cited

U.S. PATENT DOCUMENTS

| | | | |
|---|---|---|---|
| 1,153,535 | 9/1915 | Babich | 52/128 |
| 1,180,367 | 4/1916 | Babich | 52/249 |
| 1,185,614 | 6/1916 | Babich | 52/249 |
| 1,219,789 | 3/1917 | Splater | 52/35 |
| 1,267,495 | 5/1918 | Babich | 52/128 |
| 1,355,122 | 10/1920 | Bintliff | 264/35 |
| 1,402,106 | 1/1922 | Smith | 264/34 |
| 1,408,301 | 10/1922 | Jeter | 249/219.1 |
| 1,476,421 | 12/1923 | Rowland | 72/14 |
| 1,483,341 | 2/1924 | Fitch | 52/82 |
| 1,958,487 | 5/1934 | Moran | 220/565 |
| 1,983,355 | 12/1934 | Escher | 72/1 |
| 2,083,491 | 6/1937 | Chaffee | 72/14 |
| 2,094,538 | 9/1937 | Ingersoll | 249/93 |
| 2,136,390 | 11/1938 | McHugh | 72/14 |
| 2,544,828 | 3/1951 | Dobell | 72/14 |
| 2,628,403 | 2/1953 | Garrison | 249/160 |
| 2,703,777 | 9/1959 | Mitchell | 249/167 |
| 2,777,295 | 1/1957 | Bliss et al. | 220/445 |
| 2,955,341 | 10/1960 | Sinclair | 249/164 |
| 3,130,520 | 4/1964 | Newman, Jr. | 50/91 |
| 3,151,416 | 10/1964 | Eakin et al. | 264/35 |
| 3,206,900 | 9/1965 | Doyle | 52/128 |
| 3,258,510 | 6/1966 | Cullinan | 264/35 |
| 3,424,239 | 1/1969 | Coudray | 52/249 |
| 3,439,461 | 4/1969 | Chandler et al. | 52/139 |
| 3,464,175 | 9/1969 | Akita et al. | 52/249 |
| 3,471,599 | 10/1969 | Archer | 264/32 |
| 3,545,213 | 12/1970 | Sebor et al. | 61/45 |
| 3,562,977 | 2/1971 | Alleaume | 52/249 |
| 3,791,164 | 2/1974 | Laverman | 220/468 |
| 3,819,145 | 6/1974 | Huber et al. | 249/93 |
| 3,847,339 | 11/1974 | Farell | 249/93 |
| 3,848,765 | 11/1974 | Durkop | 220/414 |
| 3,863,878 | 2/1975 | Gregory et al. | 249/219.1 |
| 3,882,520 | 7/1975 | Crom, Jr. | 52/224 |
| 3,960,356 | 6/1976 | Adams | 240/93 |
| 4,053,134 | 10/1977 | Peacock | 249/97 |
| 4,183,221 | 1/1980 | Yamamoto | 220/901 |
| 4,224,265 | 9/1980 | Pfisterer | 264/71 |
| 4,271,647 | 6/1981 | Balck, Jr. | 52/169.4 |
| 4,316,575 | 2/1982 | Wheeler et al. | 249/96 |
| 4,366,654 | 1/1983 | Bomhard | 52/224 |
| 4,372,906 | 2/1983 | del Valle | 264/279 |
| 4,387,491 | 6/1983 | Schaaf et al. | 27/35 |
| 4,494,352 | 1/1985 | Leemhuis | 264/256 |
| 4,513,550 | 4/1985 | Kotcharian | 52/249 |
| 4,519,415 | 5/1985 | Carn | 220/565 |
| 4,536,103 | 8/1985 | Prescott | 249/160 |
| 4,552,166 | 11/1985 | Chadbourne, Sr. | 137/587 |
| 4,604,250 | 8/1987 | Ecker | 264/35 |
| 4,710,115 | 12/1987 | Tucker et al. | 249/91 |
| 4,715,307 | 12/1987 | Thompson | 264/256 |
| 4,799,982 | 1/1989 | Vicino | 264/35 |
| 4,826,644 | 5/1989 | Lindquist | 264/71 |
| 4,931,235 | 6/1990 | Lindquist et al. | 264/40.1 |
| 4,934,122 | 6/1990 | Lindquist | 264/31 |
| 5,058,854 | 10/1991 | Bravo | 249/93 |

Primary Examiner—Khanh P. Nguyen
Attorney, Agent, or Firm—Townsend and Townsend

[57] ABSTRACT

A vault for dual containment of the fluids by an inner tank and an outer tank is produced by the apparatus described. The tendency of the inner tank to bob up in response to buoyancy from fluid concrete is countered by a hold-down assembly. The hold-down assembly produces downward pressure on the tank which is distributed over a region of the upper surface of the tank by a pressure distribution device which is left embedded in the concrete. An adjustment device is coupled to the form to permit pushing or pulling on the tank manway to move the manway down or up to provide the proper location.

2 Claims, 11 Drawing Sheets

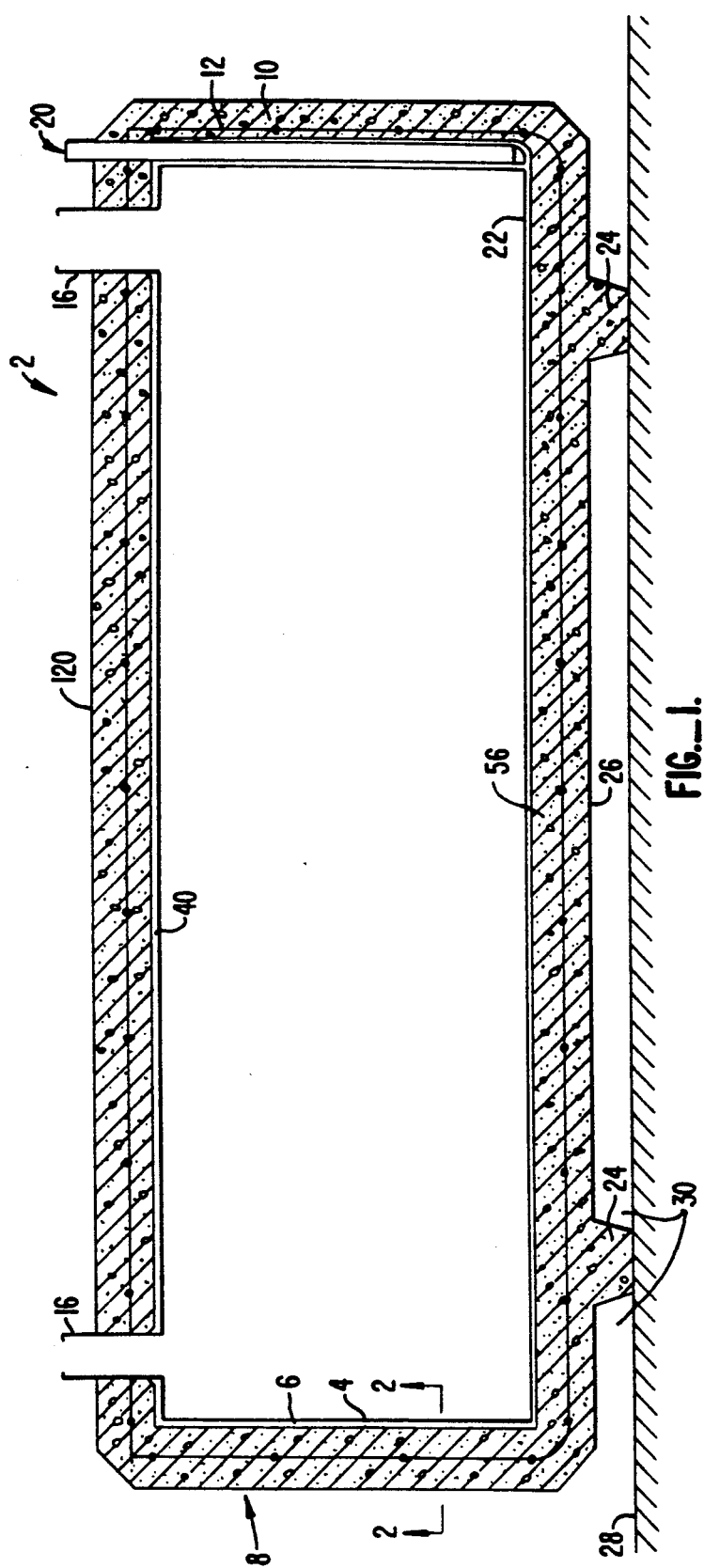
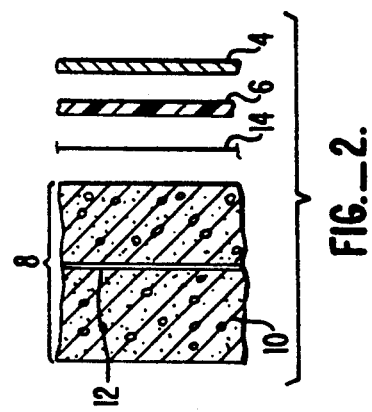
FIG._1.
FIG._2.

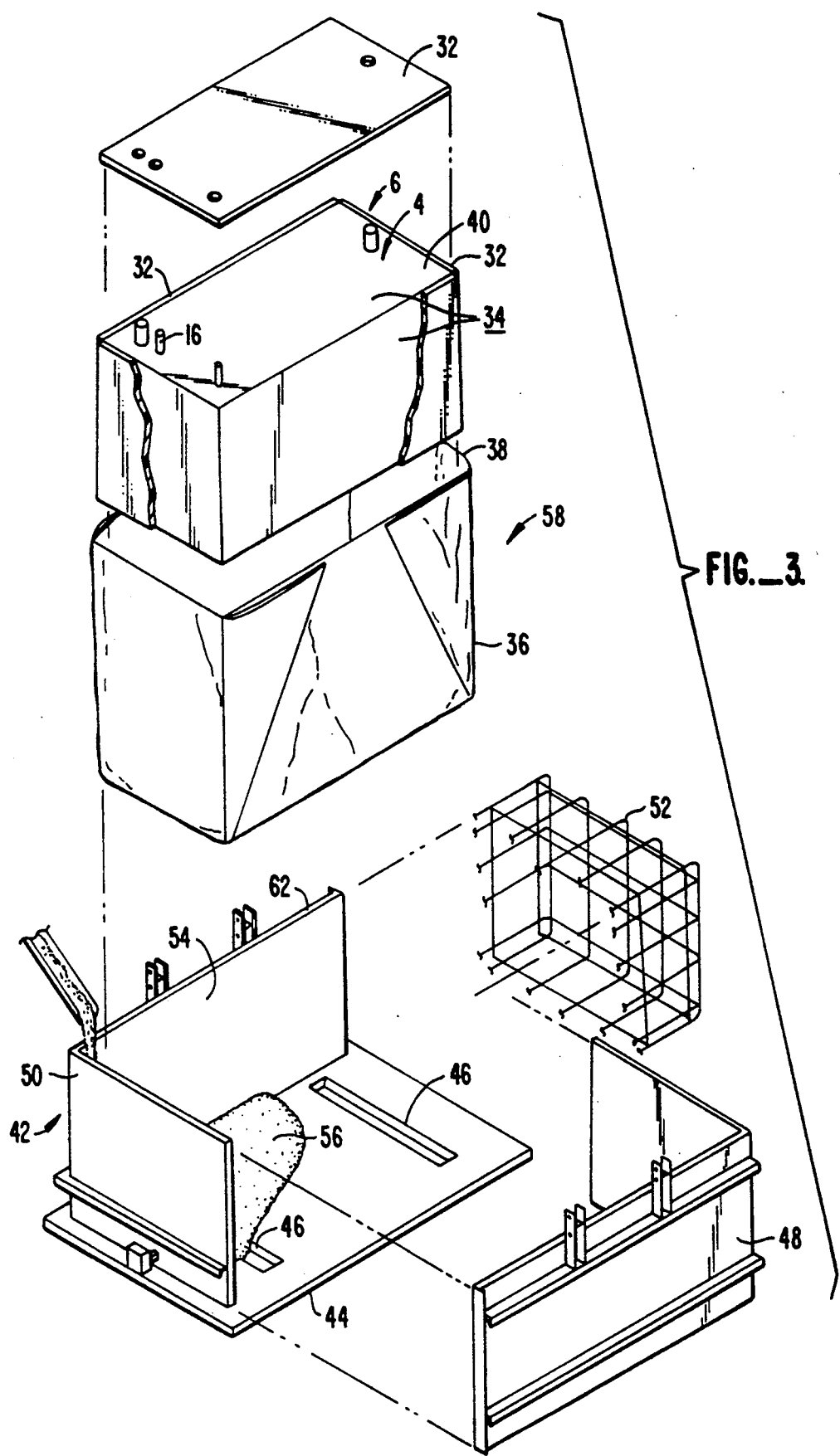

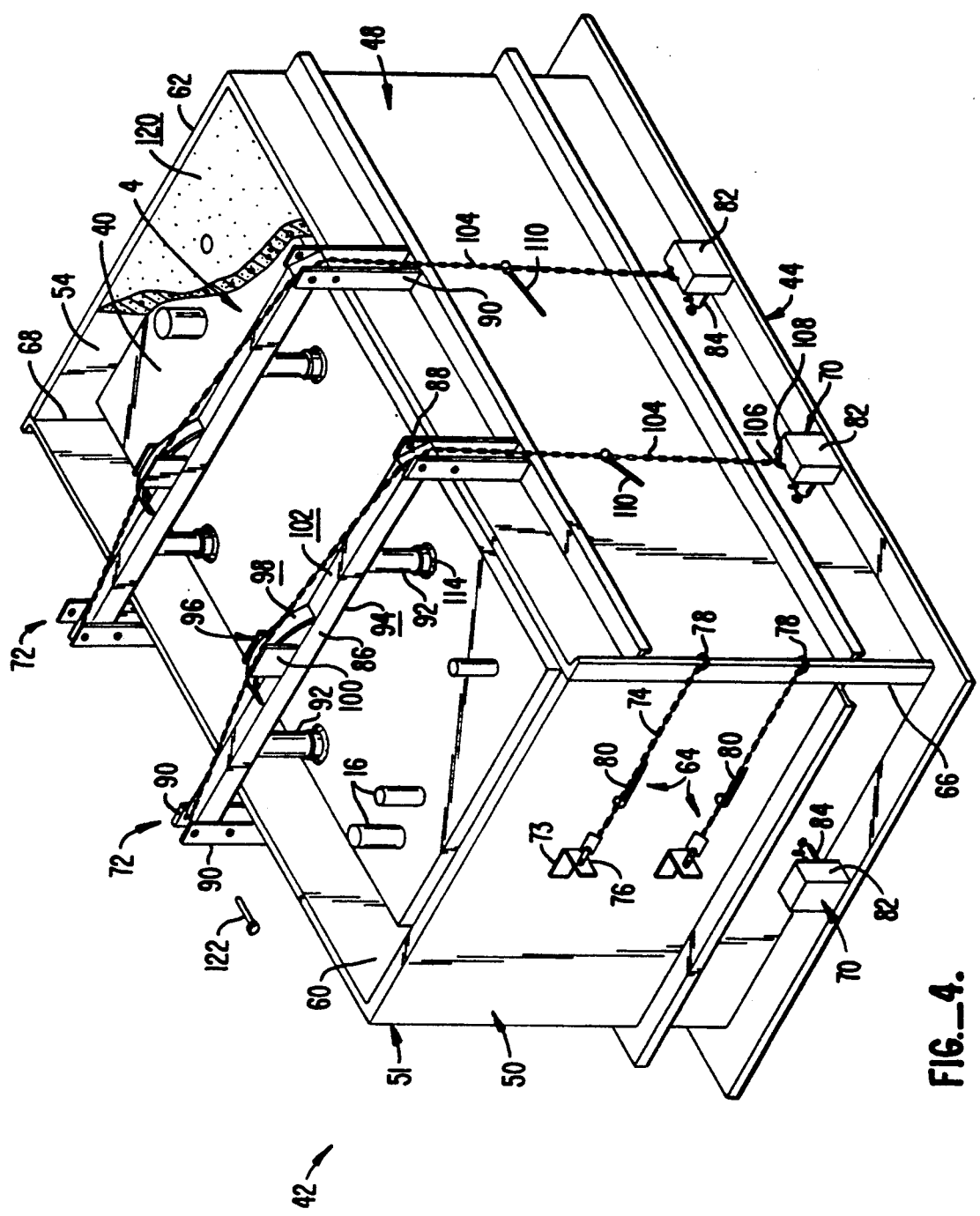
FIG._4.

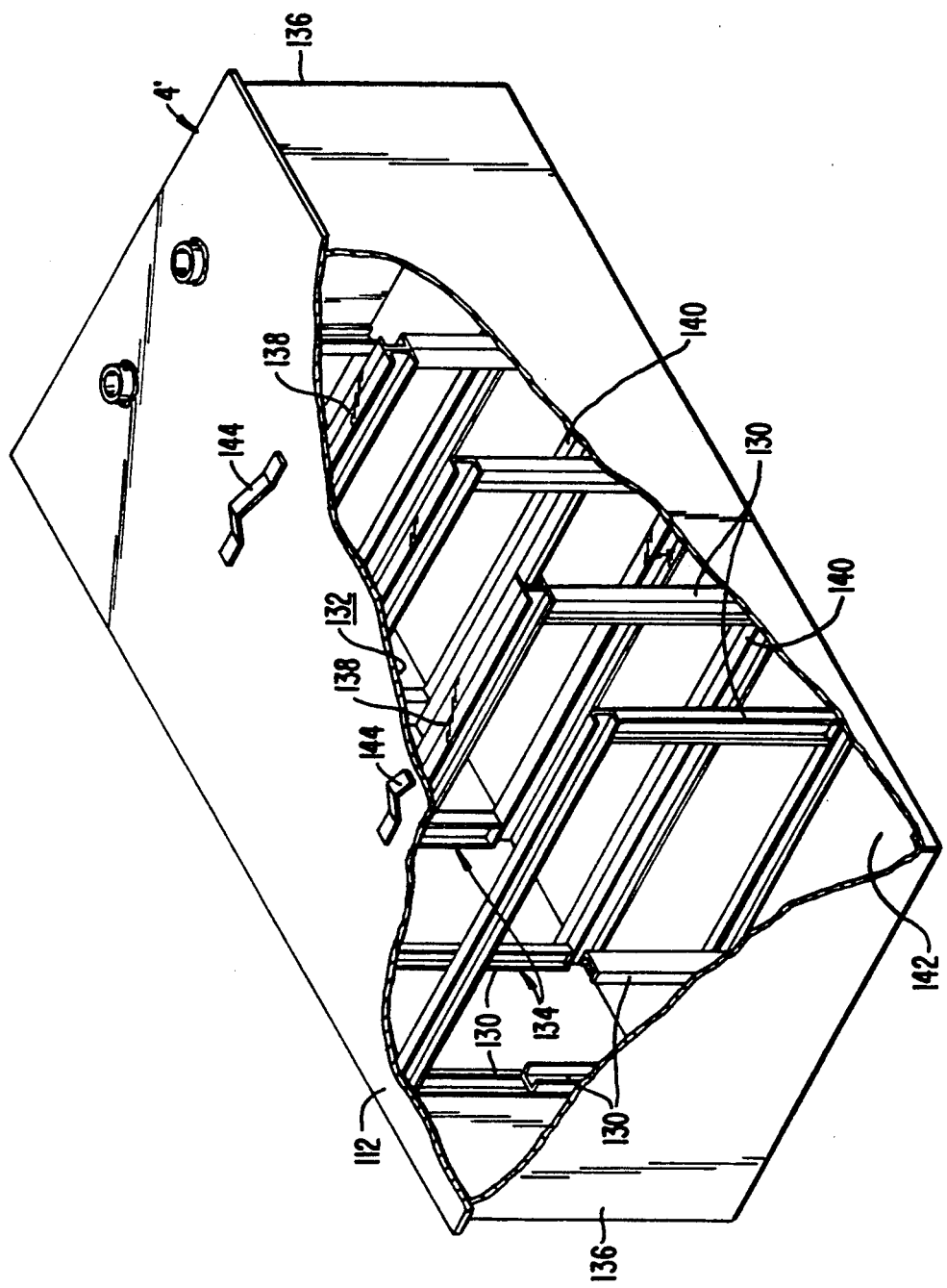
FIG._5.

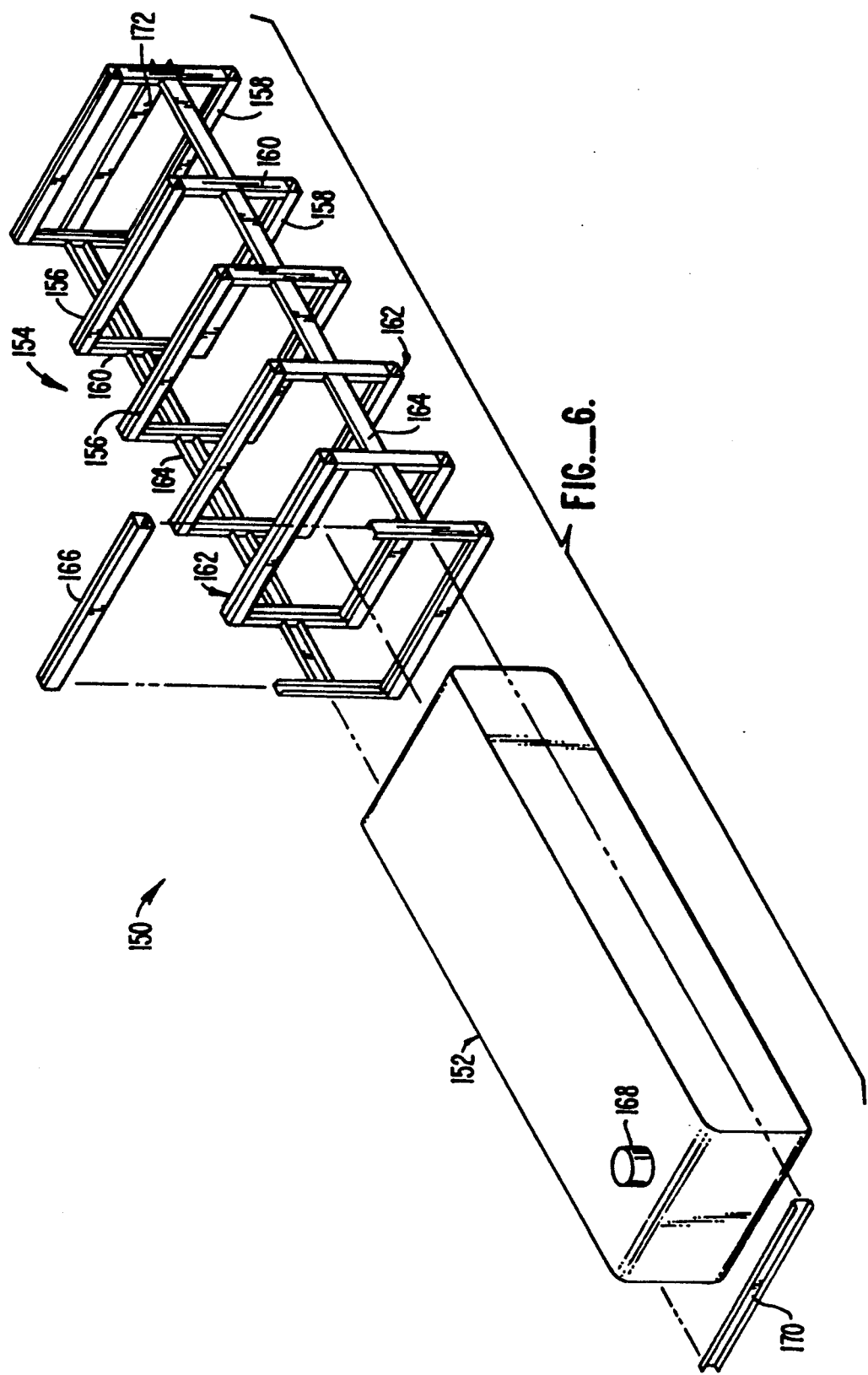

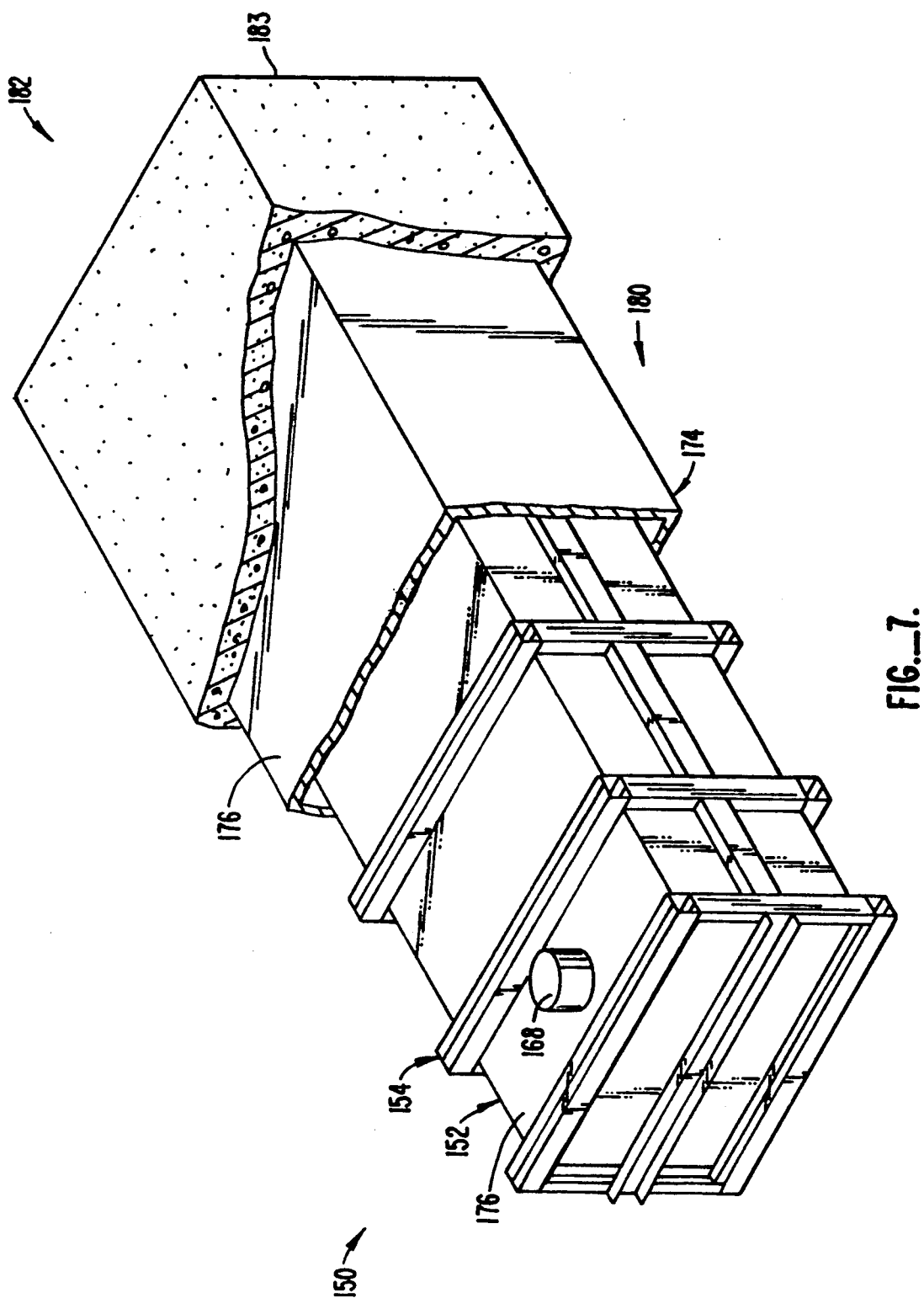

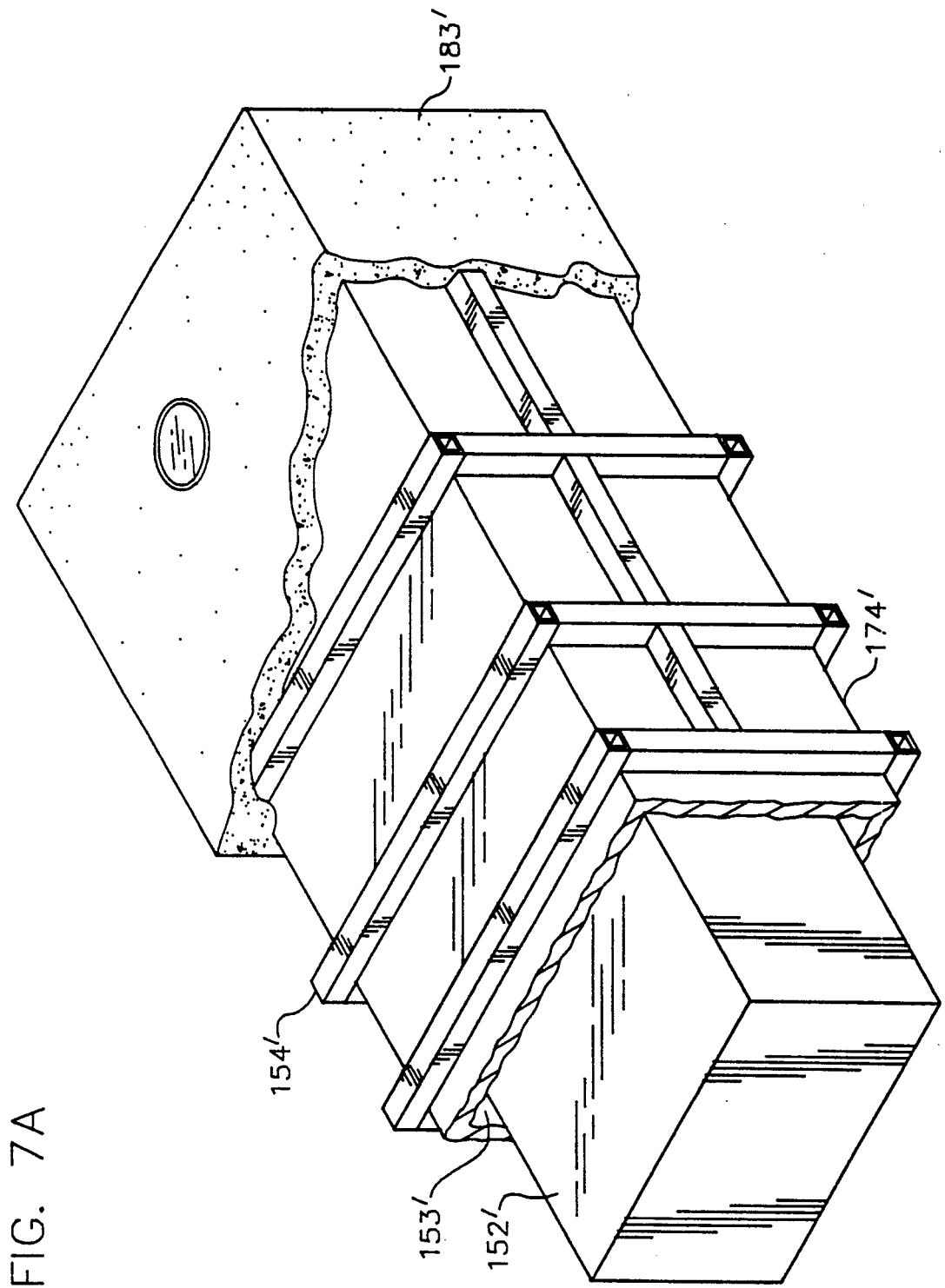

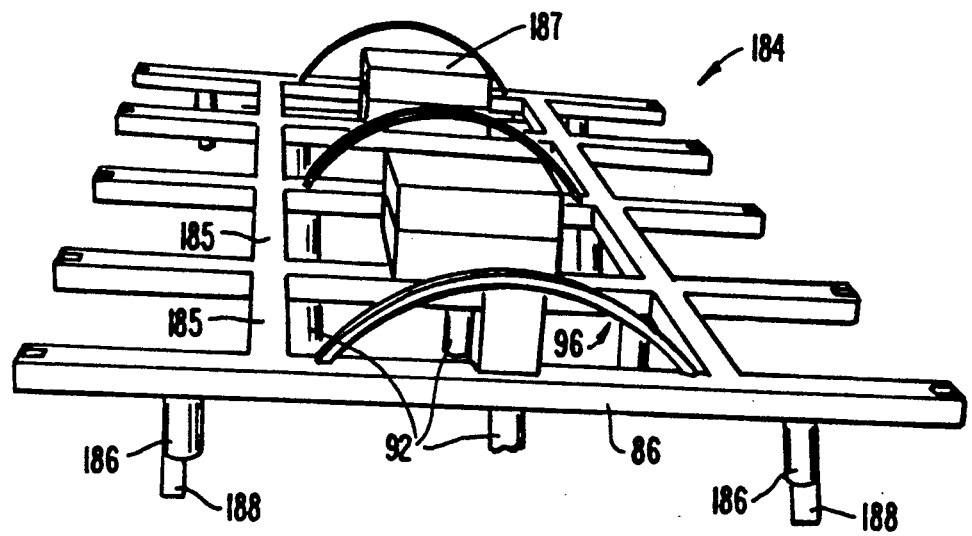
FIG._8.
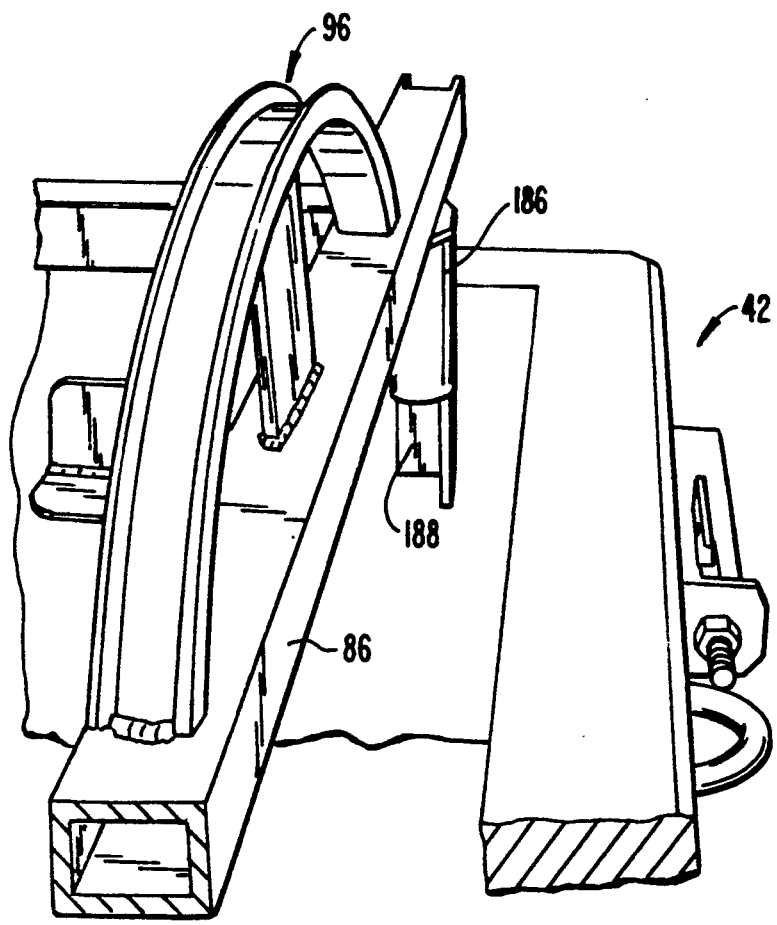
FIG._9.

000
APPARATUS FOR FORMING A FLUID CONTAINMENT VAULT

This is a continuation-in-part of U.S. patent application Ser. No. 07/541,004, filed Jun. 20, 1990 now abandoned, which is a continuation-in-part of U.S. patent application Ser. No. 07/298,548 filed Mar. 9, 1989, now U.S. Pat. No. 4,963,082, which is a division of U.S. patent application Ser. No. 07/118,919 filed Nov. 16, 1987, now U.S. patent No. 4,826,644, which is continuation-in-part of U.S. Pat. application Ser. No. 06/936,205 filed Dec. 1, 1986, now abandoned, the disclosure of each being incorporated by reference.

BACKGROUND OF THE INVENTION

There is a continuing interest in the safe containment of liquids, particularly gasoline and other fuels, because of the vast amount of fuel presently stored throughout the country. It has become increasingly apparent that underground storage tanks can and do leak, thus causing serious short-term and long-term problems. Therefore, many localities have chosen to examine all underground tanks, mostly fuel storage tanks, to determine if the tanks are leaking. It is an expensive process to inspect the tanks and test the earth surrounding the tanks for indications of leakage. Repair or replacement of tanks which are shown to be leaking increases the cost a great deal further.

Other liquids, in addition to fuels, create containment problems as well. Many liquids used in industry are hazardous from an environmental standpoint, from a safety standpoint, or both. Often these liquids are not suitable for storing in steel containers because of their corrosive or reactive properties. Although stainless steel can be used for certain chemicals, the use of large stainless steel tanks can be very expensive. Also, some chemicals are not suitable for storage in stainless steel tanks as well.

Many chemicals are now being stored in plastic and other non-metallic tanks. One such tank is made of crosslinked polyethylene, an environmentally stable material, by Poly Cal Plastics, Inc. of French Camp, California as ZORB TANKS. However, even if such non-metallic tanks are chemically suitable for many types of chemicals, they are still susceptible to damage from extreme heat and fire, as well as physical damage which could create leaks.

To aid the detection and prevention of leaks, double wall (dual containment) tanks have been used for both underground and above ground storage. The space between the two walls of the tanks is monitored for leakage. When used underground, monitors can be used to sense both water seepage in and stored liquid seepage out. If a leak is detected, the tank can be drained and abandoned, dug up and removed, or repaired in place. These options are all quite expensive. If the contaminated soil surrounding the leaking tank must be removed, the expense increases dramatically. However, conventional double wall tanks are quite expensive and are not presently able to meet fire code standards for above-ground storage of flammable liquids. Therefore, even when dual containment tanks are used, flammable liquid is most often stored in below-ground tanks.

Creating a concrete encased hollow tank is not without problems. One conventional method of doing so described in U.S. patent application Ser. No. 06/936,205 now abandoned mentioned above, is to form an open-top hollow shell, place the tank within the hollow shell and then pour the top. However, this process creates cold joints which are possible sources of leaks and weak points in the structure. Therefore, a homogenous concrete shell, which would eliminate cold joints, would be preferable. Entombing a hollow tank in fluid concrete is hindered, if not prevented, by the fact that the hollow tank has a tendency to bob up or float within the fluid concrete. Although the tank could be filled with water to give it neutral buoyancy, this solution causes other problems, including difficulties arising from trying to remove all the water from the tank after the concrete has set.

Another problem found in creating a concrete encased hollow tank relates to those tanks which have a manway, (i.e., an access to the interior or the tank, e.g., permitting human entry). Typically, the manway includes a protrusion or collar. It is difficult to position the tank as needed to avoid bobbing up while also placing the manway, particularly the top of the collar, in a usable and desired position.

A further difficulty in creating concrete encased hollow tanks relates particularly to flexible tanks (i.e., tanks which, while having some rigidity, have less rigidity than a steel tank). These tanks present the difficulty that flexibility of the tanks can lead to an undesired about of deformation of the tanks in response to forces from the concrete during pouring or setting or other forces such as pressure inside the tank.

SUMMARY OF THE INVENTION

The present invention is directed to a method and apparatus for entombing a tank or other container within a homogenous layer of concrete.

The invention includes the recognition of problems found in prior art, including those described above, as well as the methods and apparatus used to address those problems.

The invention includes addressing the tendencies of a tank to deform, particularly in the upper portions of the tank by pressing downward on the tank with a force distribution member which is left embedded in the concrete as the concrete sets. By leaving this member embedded in the concrete, it becomes unnecessary to remove the hold-down pressure early in the concrete-setting process, as would be necessary if the force distribution member were to be removed before it set in concrete. Since pressure can be maintained for a longer period of time, it is possible to use external force (i.e, force other than the resistance force provided by the concrete) to counteract the deforming tendency of the flexible tank until such time as the concrete-setting process has proceeded to a point where the concrete has hardened sufficiently to substantially end the buoyancy forces and/or where the concrete has sufficient strength to withstand the deformation tendencies of the tank without the assistance of such external force.

According to one aspect of the invention, a device is provided for adjusting and maintaining the height or position of the manway and/or levelling the rim of the manway collar. Preferably, the adjustment device operates separately and independently from the hold-down device so as to adjust the manway to a desired position without moving the top of the tank from the desired height. Adjustment of the manway has been found to be particularly difficult and particularly important in those embodiments in which a plastic tank is directly embedded in concrete (i.e., without an external framework).

The manufacturing process for plastic tanks typically produce tanks with a large amount of dimensional variance among the tanks. For this reason, the spatial relationship of the manway to the rest of the tank (such as the top surface of the tank) varies from tank to tank. Furthermore, because of the flexibility of plastic tanks, the manway, if not restrained, can move during setting of the concrete, e.g., in response to deformation of the tank caused by fluid or pressure forces generated during the setting process. In one embodiment, the devices for positioning the tank and/or the manway contact the tank but do not contact the inner surface of the form 242.

Preferably, the method is carried out using wall forms combinable to create a circumferential sidewall form which is mounted to a base plate. The wall forms are secured to one another and are laterally positioned on the base plate, preferably using hydraulic jacks. The sidewall form and base plate define an open-top enclosure within which the tank is positioned. Concrete is poured within the enclosure to surround the tank to create the concrete outer tank. One or more hold-down members are mounted over the tank in the enclosure. The hold-down members press on the top of the tank to keep the tank from floating while the concrete is fluid. The hold-down members keep the tank properly horizontally and vertically positioned within the form to ensure a proper concrete wall thickness is maintained.

In one embodiment the storage vault is created by wrapping the combination inner tank and spacer layer with a large sheet of polyethylene. The edges of the liner are gathered at the top of the tank so that any leaks from the inner tank are contained by the liner. The spacer layer encased, polyethylene liner wrapped, inner tank is then entombed within a layer of concrete, preferably reinforced concrete.

The outer tank preferably includes bottom supports. The bottom supports lift the tank a few inches above the support surface on which the tank rests to provide a visual inspection region between the bottom of the outer tank and the support surface so the user can visually monitor for leaks from the vault.

The spacer layer may be chosen so that if the liquid stored within the inner tank contacts the spacer layer, the spacer layer dissolves or "melts" thus permitting the leaked liquid to gather within a liquid collection region between the inner tank and the liner. A leak detection tube is used between the inner tank and liner to permit monitoring of the liquid collection region between the layers. This arrangement provides for maximum thermal insulation without sacrificing the ability to monitor for leaks. The spacer layer, being a good thermal insulator, provides further protection for the contents of the inner tank during fires. The added insulation also helps moderate the temperature swings of the liquid within the inner tank which aids the control of atmosphere pollution, as well as reducing safety risks. Since no air space needs to be provided between the inner and outer tanks for leak detection, pouring the concrete around the combination of the inner tank, spacer layer and liner is much simpler.

The use of reinforced concrete as the outer tank provides several advantages. The concrete provides a protective physical barrier for the inner tank, to protect the inner tank from physical damage, at a reasonable cost. The concrete outer tank also serves as an effective thermal barrier. By using an Underwriters Laboratories listed inner tank and the reinforced concrete outer tank, an above-ground storage vault suitable for use with flammable liquids is achieved.

The invention is transportable and can be used above ground to store flammable liquids. This allows the storage vault to be especially suited for temporary use at construction sites. The costs associated with burying tanks underground are also eliminated with the present invention. If desired, multiple storage vaults can be used and connected in parallel or in series according to the use requirements. Also, two or more inner tanks can be placed within a single outer tank.

Preferably the storage vault has a flat bottom. Unlike many prior art storage containers, which are spherical or cylindrical and must be supported on a stand, the invention needs no separate support stand. The invention is extremely stable and thus is quite resistant to damage from earthquakes.

With the present invention a flammable liquid can be stored safely above ground. This removes the tank from local regulations and codes dealing with monitoring below-ground storage tanks. The present invention still permits the user to effectively monitor for leaks before any contamination to the surrounding earth occurs. The ability to monitor the region between the primary and secondary containment vessels and the provision of skids or supports on the bottom of the storage vault so that the region beneath the outer tank can be visually inspected, provides a double measure of protection against damage to the environment.

The invention permits a user to store flammable fuels above ground while meeting environmental and safety requirements at a cost much less than comparable buried storage tanks.

The invention also permits the concrete outer tank to be made of a homogenous layer of concrete. This eliminates cold joints, which are created when concrete must be poured in several steps and allowed to harden between the pours.

Another aspect of the invention relates to the use of containers or tanks which are useful for holding various chemicals. These tanks are typically not metallic but are often made of plastic. It may be desirable to entomb the plastic tank directly in the concrete. To do so the plastic tank is preferably pressurized, such as at 0.5 to 1.0 psi (0.034 to 0.069 bar), so the sides of the plastic tank bow outwardly somewhat to resist the inward pressure of the wet concrete. Further, plastic tanks, particularly the upper portion thereof, tend to expand or "balloon" in response to a buoyant force, to a much greater extent than a steel tank. In some embodiments, devices are used to distribute the load on top of the plastic tank created by a hold-down force used to counteract the large buoyant forces from the wet concrete. Pressure distribution can be activated by providing embeddable pressure distribution devices or using a greater number of hold-down members, such as 12-20 instead of 4.

In some cases non-metallic tanks, typically plastic, are to be subjected to positive internal pressures, such as 6 psi (0.41 bar), to eliminate the need to use pumps to remove the contents of the tank. Since plastic tanks tend to bow outwardly under internal pressurization, this would exert a pressure on the concrete layer. According to one method, to eliminate this problem, the plastic tank can be mounted within an external framework which generally holds the walls of the tank in place. The framework-enclosed plastic tank is then placed within an intermediate barrier tank, which is preferably made of steel. The intermediate barrier tank is then sealed shut and is entombed as discussed above. The walls of the plastic tank between the framework members may bow outwardly when the tank is pressurized; however, the framework members are sized so that the plastic tank walls do not push against the walls of the intermediate barrier tank so to keep from exerting forces directly on the intermediate barrier tank. The external framework is sufficiently rigid to minimize or substantially eliminate exertion of pressurization forces from the plastic tank, through the external framework and to the intermediate barrier tank. This is expected to substantially eliminate tension forces on the concrete outer tank when the inner plastic tank is pressurized.

The inner plastic tank could be made of materials other than plastic, such as fiberglass construction or other resin impregnated structures. Also, the region between the inner and intermediate tanks can be monitored for leaks in addition to, or instead of, monitoring for leaks between the intermediate barrier tank and outer concrete tank.

Other features and advantages of the invention will appear from the following description in which the preferred embodiments have been set forth in detail in conjunction with the accompanied drawings.

BRIEF DESCRIPTION OF THE DRAWINGS

FIG. 1 is a side cross-sectional view showing a vault made according to the present invention;

FIG. 2 is an exploded cross-sectional view taken along line 2—2 of FIG. 1;

FIG. 3 is a schematic illustration showing a method for making the vault of FIG. 1;

FIG. 4 shows the inner tank of FIGS. 1-3 within the form assembly of FIG. 3;

FIG. 5 illustrates the internal reinforcing members of the inner tank of FIG. 4 allowing the tank to be used as a pressure vessel;

FIG. 6 is an exploded isometric view of a plastic tank assembly;

FIG. 7 is an isometric view of a further alternative embodiment of a vault made according to the invention with portions broken away to show the use of the plastic tank assembly of FIG. 6 enclosed within a steel tank which is entombed within a concrete tank;

FIG. 7A is similar to FIG. 7, but shows an alternative embodiment.

FIG. 8 illustrates a hold-down assembly used when entombing a non-metallic tank and using special corner guides.

FIG. 9 is an enlarged view of the corner guide of FIG. 8;

DESCRIPTION OF THE PREFERRED EMBODIMENTS

Figure 10:
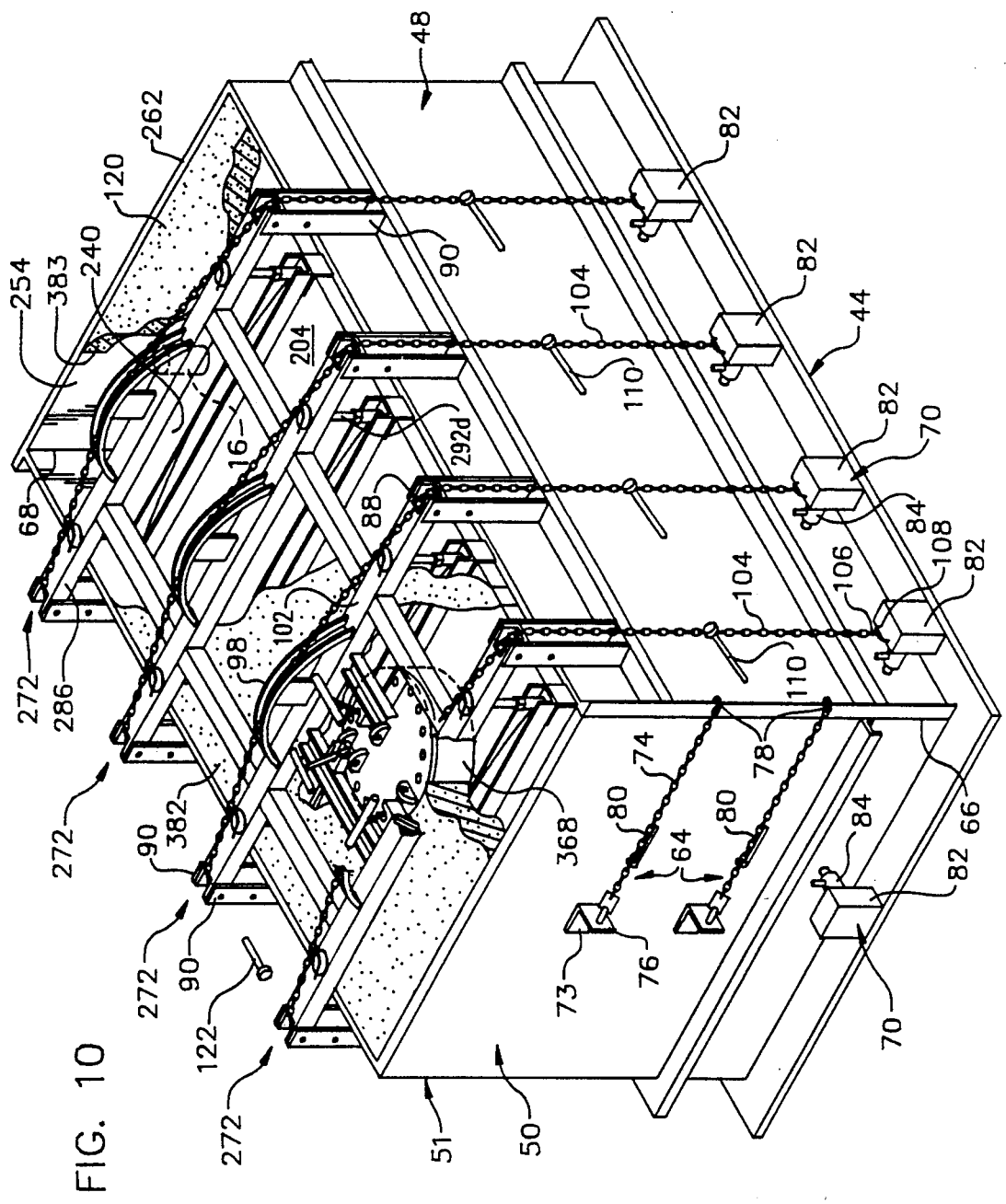
FIG. 10 is a perspective view similar to FIG. 4 but showing an alternate hold-down apparatus and manway adjustment system.

Referring now to FIGS. 1 and 2, a vault 2 is shown to include a steel inner tank 4 surrounded by a spacer layer 6 of polystyrene. Inner tank 4 and spacer layer 6 are entombed or encased within an outer tank 8. Outer tank 8 includes a concrete layer 10 strengthened by rebar 12, and a liquid impervious liner 14, preferably by a sheet of polyurethane film. Conventional fill and vent pipes 16 extend from inner tank 4. A leak detector tube 20 is positioned between inner tank 4 and liner 14 and terminates at a liquid collection region 22. Tube 20 permits leaks from inner tank 4 to be monitored as the leaking liquid collects within region 22.

Spacer layer 6 performs a dual function. Spacer layer 6 is a good thermal insulator so to insulate the contents of inner tank 4 from external heat sources, such as forest fires. In addition, spacer layer 6 helps keep the contents of inner tank 4 at a more uniform temperature than would otherwise exist. This helps reduce vapor pressures within inner tank 4 making the storage of liquids safer and reducing the potential for vapor leaks to the atmosphere. In addition, spacer layer 6 is chosen so that it melts or liquifies when the liquid within inner tank 4 contacts the material of the spacer layer. Typically, inner tank 4 will hold a liquid hydrocarbon fuel, such as gasoline or diesel fuel. By choosing a spacer layer 6 made of polystyrene, if the liquid within tank 4 leaks through and contacts spacer layer 6, polystyrene spacer layer 6 melts or dissolves thus creating an open region between inner tank 4 and outer tank 8 permitting the leaked hydrocarbon to collect at liquid collection region 22. This permits the leak to be quickly noticed through leak detector tube 20 using conventional methods.

As a further aid to detection of leaks, outer tank 8 includes bottom supports 24 which raise the bottom 26 of vault 2 above the support surface 28 to create an inspection region 30 between bottom 26 and support surface 28.

Turning now also to FIG. 3, a simplified view of the method for making vault 2 is shown. First, an appropriate inner tank 4 is selected and has a number of polystyrene panels 32 secured to the outer surface 34 of inner tank 4, typically by an adhesive. A large sheet 36 of a liquid impervious material, such as polyethylene film, is wrapped around the spacer layer encased inner tank. The edges 38 of sheet 36 are gathered over the top 40 of inner tank 4 so to create a second liquid barrier.

A concrete form assembly 42 is used to entomb the inner tank 4, spacer layer 6, liner 14 combination. Form assembly 42 includes a base plate 44, having a pair of openings 46, used to form bottom supports 24, and two L-shaped wall forms 48, 50. Wall forms 48, 50 constitute a sidewall form 51. After assembly of base plate 44 and wall forms 48, 50, a rebar cage 52 is placed within an enclosure 54 defined by wall forms 48, 50 and base plate 44. Typically, the rebar will be steel, although when it is desired to avoid the heat sink effect of thermally conductive steel, other reinforcing material can be used, such as fiberglass fabric or bars. A layer 56 of concrete is then poured within enclosure 54 to cover base plate 44. The combination 58 of inner tank 4, spacer layer 6 and sheet 36, which creates liner 14, is then positioned within enclosure 54 on top of the still wet layer 56 of concrete. Additional concrete is then placed within the region 60, see FIG. 4, between combination 58 and wall forms 48, 50 sufficient to cover combination 58 and be generally level with top edge 62 of sidewall form 51. The specific construction of form assembly 42 will now be discussed with reference to FIG. 4, in particular the structure for keeping combination 58 from bobbing up out of the fluid concrete.

Form assembly 42, in addition to wall forms 48, 50 and base plate 44, includes a pair of form clamp assemblies 64 at opposite corners 66, 68 of sidewall form 51, a lateral positioning assembly 70 adjacent base plate 44 and a pair of hold-down assemblies 72 which keep inner tank 4 from floating within the concrete while it is fluid.

Clamp assemblies 64 each include an L-bracket 73, welded to sidewall form 51, and a chain 74, secured at one end to L-bracket 73 by an adjustment bolt 76. Chain 74 has a hook 78 at the other end which engages the corner of the adjacent wall form 48 or 50. Chain 74 is tightened using a chain binder 80 which allows the user to easily apply a strong clamping load on the two wall forms 48, 50. Adjustment bolt 76 can be used to provide any necessary fine adjustment to the tension in chain 74. It has been found that use of two L-shaped wall forms 48, 50 and four form clamp assemblies 64 allow wall form 50 to be easily but securely fastened together while ensuring the proper, in this rectangular, shape is maintained.

Lateral positioning assemblies 70 each include a jack block 82 welded to base plate 44 at a position spaced apart from wall forms 48, 50. A hydraulic jack 84 is mounted between each jack block 82 and the opposing side of wall forms 48, 50. Applying sufficient force on wall forms 48, 50 through the use of jacks 84 positions sidewall form 51 on base plate 44 and keeps the lower ends of sidewall form 51 from moving laterally outwardly due to the pressure of the concrete while it is still fluid.

Each hold-down assembly 72 includes an elongate hold-down bar 86 having chamfered ends 88 guided between vertical guide plates 90. Guide plates 90 are mounted to wall forms 48, 50 and extend above top edge 62. Hold-down bar 86 has a pair of downwardly extending hold-down tubes 92 depending from its bottom surface 94 and a strong back 96 mounted centrally above the top surface 102 of hold-down bar 86. Strong back 96 has an arcuate guide surface 98 and a pair of vertical guide plates 100. Hold-down assembly 72 includes a chain 104 having each end 106 secured to an anchor point 108 on jack block 82. Chain 104 passes from the jack block 82 on one side of form assembly 42, between vertical guides 90, across chamfered ends 88, over curved surface 98 of strong back 96 and down past the chamfered ends of hold-down bar 86 on the other side. Hold-down assembly 72, also includes a chain ratchet 110. Chain ratchet 110 is used to shorten the effective length of chain 104 thus forcing tubes 92 against the top 40 of inner tank 4.

Guide rings 114, each having an internal diameter slightly larger than the external diameter of tubes 92, are welded to top 40 at positions chosen to engage the lower ends of tubes 92. Once so engaged, lateral, as well as upward, movement of inner tank 4 within enclosure 54 is substantially eliminated.

Strong back 96 is used to strengthen hold-down assembly 72. Strong back 96 keeps hold-down bar 86 from bowing upwardly due to the upward force on the hold-down bar caused by tank 4 attempting to float when surrounded by fluid concrete.

Turning now to FIG. 5, an inner tank 4' is shown to include U-channel reinforcing members 130 welded to the inside surface 132 of inner tank 4' so that inner tank 4' may be used as a pressure vessel. Reinforcing members 130 form a number of hoops 134 circumscribing the interior of tank 4'. The ends 136 of inner tank 4' have vertically extending reinforcing members 130 mounted along their interior surfaces as well. Pairs of reinforcing members 130 are placed back to back at positions 138 along top 112 of inner tank 4' and at positions 140 along the bottom 142 of inner tank 4'. This provides extra strength along the central portion of tank 4'. A pair of lifting brackets 144 are welded to top 112 of tank 4' adjacent positions 138 to facilitate moving tank 4'.

A vault 2 made with an inner tank 4' can be used as a vacuum storage vessel to safely handle waste motor oil or crank case motor oil. The vault incorporating reinforced inner tank 4' could have a vacuum continuously applied to the inner interior of inner tank 4'. A hose (not shown) would then be used to connect inner tank 4' to the oil, or other liquid, to be disposed of. The waste oil so collected could then periodically be removed from the vault through the use of, for example, a mobile vacuum tank truck which can suck the waste oil directly out of the inner tank 4' and into the mobile tank. This would permit gasoline service stations, auto dealers, lube and oil change centers, among others, to safely and conveniently store the waste oil and grease in a safe, cost-effective manner. Even without creating a vacuum in the interior of a vault 2, vault 2 would still be useful for safely and inexpensively storing such waste oil, waste grease and other flowable materials, by pumping or pouring the waste material directly into the vault.

To use form assembly 42, base plate 44 is positioned on a, preferably, level support surface. Wall forms 48, 50 are positioned on base plate 44 and are fastened to one another by form clamp assemblies 64 at each corner 66, 68. Hydraulic jacks 84 are then operated to properly position sidewall form 51 on base plate 44 and keep the bottom of the sidewalls from kicking out due to the pressure of the fluid concrete. Rebar cage 52 is then placed within enclosure 54 and a layer 56 of concrete is poured into enclosure 54 to create bottom 26 of outer tank 8. Combination 58, see FIG. 3, is then lowered into enclosure 54 until it rests on layer 56 of concrete.

Hold-down bars 86 are then positioned over enclosure 54 and lower ends of tubes 92 are positioned within rings 114. Chains 104 are then placed over hold-down bar 86 and fastened to jack blocks 82 at anchor points 108. Chain ratchets 110 are used to tighten chains 104 sufficiently to place an appropriate force on hold-down bars 86. Concrete is then poured into enclosure 54 to entomb combination 58, with the exception of various fill and vent pipes 16 extending up through concrete outer tank 8. Note that layer 56 of concrete is still wet when the subsequent pour of concrete is made. This ensures a homogenous concrete layer 10 with no cold joints. Sidewall form 51 is then vibrated to settle the aggregate in the concrete. The top surface 120 of outer tank 8 is smoothed. Shear pins 122 can be used to keep hold-down bars 86 from moving upwardly past upper holes 124 in vertical guides 90.

Once the concrete has set sufficiently, chain ratchets 110 are actuated to loosen chains 104, shear pins 122 are removed from holes 124 and hold-down bars 86 are lifted upwardly to remove tubes 92 from the layer of concrete covering top 112 of inner tank 4. The holes left by removal of tubes 92 are filled with fresh concrete. After the concrete has cured sufficiently, side-wall form 51 is removed from vault 2 and vault 2 is separated from base plate 44.

The entombment of inner tank 4 could be accomplished in other ways as well. For example, inner tank 4 could be placed into form assembly 42 to rest on base plate 44. Concrete could be pumped into form assembly 42 through openings in base plate 44 to cause inner tank 4 to lift above the base plate, with the remaining procedure proceeding as above.

Some chemicals require specialized, expensive equipment to pump the chemicals from a holding tank through a line. With a vault 2 made to withstand pressurization, the air space above the free surface of the liquid within the vault may be pressurized to force the chemical from the vault without the chemical passing through a pump. Similarly, the chemical could be sucked into the vault 2 by placing the air space in the vault at a partial vacuum as well.

Some materials are not suitable for storage in a metal, typically steel, tank. Many chemicals are therefore stored in plastic tanks. Although possessing many advantages, plastic tanks are generally not nearly as strong or rigid as steel tanks. The present invention can be used with plastic (or other non-metallic) tanks if appropriate modifications are made. At FIG. 6 a plastic tank assembly 150 is shown to include a plastic tank 152 and an external framework 154. External framework 154 includes a set of upper and lower horizontal members 156, 158 formed from 3-inch or 4-inch U-channels welded together along their lengths. Vertical members 160 are welded to corresponding upper and lower horizontal members 156, 158 to create a number of circumferential rings 162. Rings 162 are secured together by horizontal side members 164.

External framework 154 is substantially completed as shown in FIG. 6 and then plastic tank 152 is moved into the interior of framework 154. After tank 152 is in position within framework 154, as shown in FIG. 7, the end-most horizontal member 166 is welded in place. This is necessary due to the location of a manhole protrusion 168 on tank 152. Manhole protrusion 168 may be plastic, metal or some other material. Also, an end bar 170 is welded in place in a position similar to the end bar 172 at the other end of external framework 154. When assembled, plastic tank assembly 150 is placed into a steel tank 174, see FIG. 7, which is similar to steel tank 4.

In a modification of the embodiment of FIG. 7 (shown in FIG. 7A), the framework 154, is positioned around the outside of the steel tank 174, rather than between the steel tank 174 and the inner tank 152. In this way, the inner tank 152, when pressurized, will, expand into the inter-tank space 153 to contact a flat, conforming surface (i.e., the interior of the steel tank) providing a more desirable distribution of pressure. In this modification, the framework 174 can be fully embedded, or partly embedded in the concrete 183.

Steel tank 174 has a top 176 with an opening (not shown) sized and positioned for receipt of manhole protrusion 168. Any gap between manhole protrusion 168 and the opening is sealed, such as using a silicone sealant, such as G.E. SILICONE II, Stock No. GE5090, which is apparently covered by U.S. Pat. Nos. 4,417,042 and 4,843,973. Plastic tank assembly 150 and steel tank 174 combine to act as an inner tank assembly 180 which can be entombed in the same manner as inner tank 4 to create a vault 182.

When inner tank assembly 180 is used, the user is provided with what can be considered a triple-wall tank structure with collection regions between plastic tank 152 and steel tank 174 and also between steel tank 174 and the concrete outer tank 183. Leaks can be monitored in either or both regions. If desired, polystyrene panels 32 and sheet 36 (not shown in FIG. 7 for sake of clarity) may be eliminated, although at the expense of additional protection.

The use of steel tank 174 provides several functions. It keeps the wet concrete from pressing on plastic tank 152, which could potentially collapse the plastic tank. Steel tank 174 also acts as a protective barrier for plastic tank 152. In addition, by separating plastic tank 152 from steel tank 174, and thus from concrete outer tank 183, vault 182 can be used in a pressurized state. That is, providing a positive pressure to plastic tank 152 of about 6 psi (about 0.41 bar) permits the contents of the plastic tank to be forced out of the tank without the passage of the contents through a pump. Since many chemicals are quite damaging to pumps, making inner tank assembly 180 suitable for pressurization eliminates the need for using a pump to draw the chemical from assembly 180. Although it is expected that the walls of plastic tank 152 will bow outwardly between circumferential rings 162, side members 164 and end bars 170, 172, external framework 154 is configured so that plastic tank 152 will not touch steel tank 174. In fact, it is preferred that the maximum amount of deflection of the plastic tank be about one-third the distance between plastic tank 152 and steel tank 174. The use of external framework 154 thus substantially eliminates any exertion of internal pressure on steel tank 174 so that, in turn, steel tank 174 does not exert any pressure on concrete outer tank 183.

Tank 152 is preferably of the type made by Poly Cal Plastics, Inc. of French Camp, California under the name Zorb Tanks. This tank is made of a cross-linked polyethylene to be environmentally stable and has a wall thickness of about $\frac{1}{2}$ inch (about 12.7 mm) for sufficient strength. However, when exposed to sunlight, elevated temperatures and oxygen, the stability of the material is lessened. Of course, being a plastic, it is sensitive to excessive heat and fire as well. Therefore, the protection afforded by concrete outer tank 183, polystyrene panels 32 and steel tank 174 eliminates many of the shortcomings which otherwise exist with this or other plastic tanks.

Turning now to FIG. 8, a hold-down assembly 184, similar to hold-down assembly 72, is shown with like elements referred to by like reference numerals. Hold-down assembly 184 includes 12 hold-down tubes 92 instead of the four hold-down tubes shown in the embodiment of FIG. 4. Hold-down assembly 184 is more rigid than assembly 72 through the use of more hold-down bars 86, cross-bars 185 and stiffener tubes 187 welded to bars 86. This is so because hold-down assembly 184 is used when plastic tank 152 is entombed directly within the concrete without the use of external framework 154 or steel tank 174. Doing so helps distribute the forces exerted by hold-down assembly 184 on the top of plastic tank 152 due to the buoyant forces created by the fluid concrete.

Hold-down assembly 184 does not require the use of any sort of guide rings 114 as used with the embodiment of FIG. 4. Rather, corner hold-down tubes 186, shown in more detail in FIG. 9, each include a corner guide 188 extending downwardly therefrom, the corner guides engaging the four corners of plastic tank 152. Since hold-down assembly 184 is properly positioned with respect to the form assembly 42 with which it is used, plastic tank 152 is properly positioned by the guidance given by corner guides 188. Using corner guides appropriately configured to engage the corners or edges, of tank 152, or of any other tank used with the invention, eliminates the need for special guiding structure such as used with the embodiment of FIG. 4.

It is preferred that plastic tank 152 be pressurized above atmospheric pressure during direct entombment within the concrete. Doing so at relatively moderate pressures, for example about ½ to 2½ (about 0.035 bar to about 0.17 bar), causes tank 152 to expand slightly. This pressurization has been found to generally eliminate the need for internal bracing within tank 152.

The elevated pressure within tank 152 is preferably reduced after the concrete has set. This permits tank 152 to shrink back to its original shape. It is believed that a small space or gap is created between tank 152 and concrete layer 8. This space or gap forms an internal expansion region for tank 152 to accommodate subsequent pressurizations. This system of pressurization is disclosed in more detail in U.S. patent application Ser. No. 07/319,598 filed Mar. 6, 1989, now U.S. Pat. No. 4,931,235 issued Jun. 5, 1990, the disclosure of which is incorporated by reference.

Figure 11:
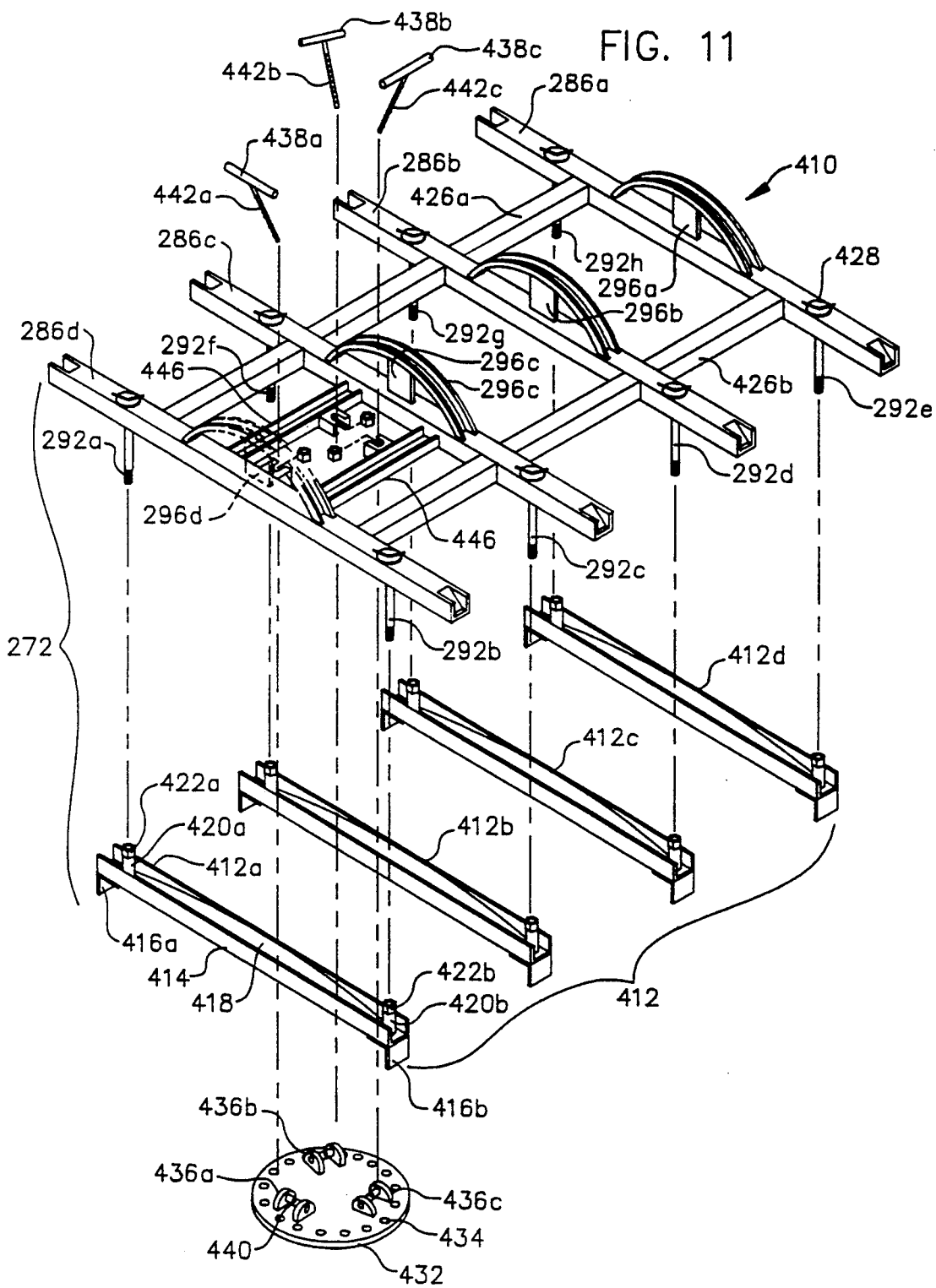
FIG. 11 is an exploded perspective view of the hold-down apparatus and manway adjustment system of FIG. 10.
Figure 11A:
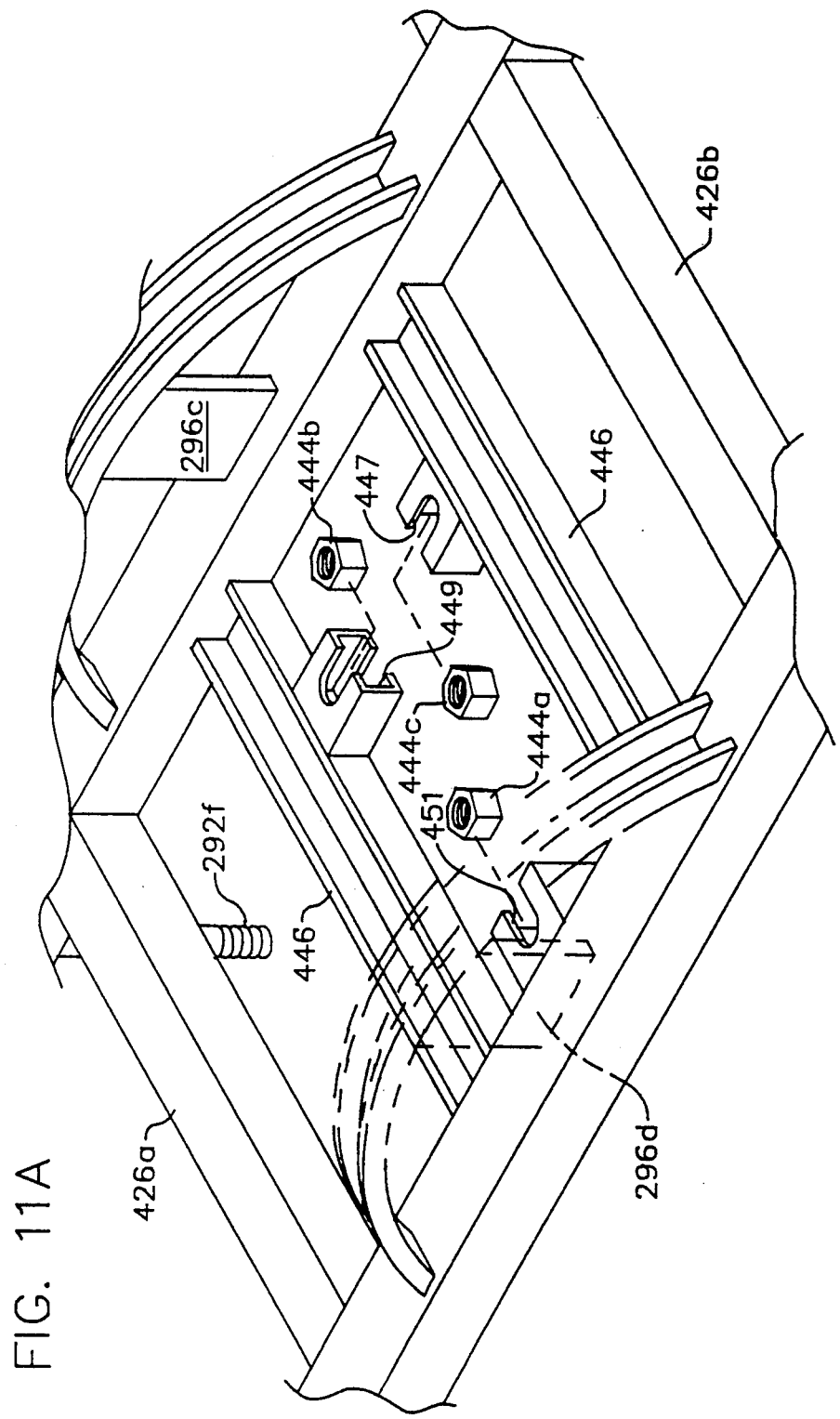
FIG. 11A is a detail view of a portion of FIG. 11, showing portions of the manway adjustment systems.

FIGS. 10, 11, and 11A depict another embodiment for forming a vault, e.g., in connection with a plastic tank. Such a tank is typically buoyant with respect to a fluid concrete, and may include one or more internal struts or walls or an internal framework, e.g., as depicted in FIG. 5. The embodiment of FIGS. 10 and 11 provide a manner producing the fluid containment vault having an inner tank made of plastic but without an external framework. FIG. 10 shows a perspective partially cutaway view of a tank 204 having an upper surface 240 positioned in a form assembly 242. The form assembly defines an enclosure 254. The tank 204 maybe covered with a spacer layer and/or liner and encased in a rebar cage, as discussed above in connection with other embodiments. The form 242 has a top edge 262. A vertical restraint device, such as hold-down assembly 272 includes at least one hold-down bar 286 connected to hold-down extenders 292a–h. The upper portion 410 includes strong backs 296a–c which function in a manner similar to corresponding members described above in connection with other embodiments. The tank 204 includes a manhole protrusion 368. As described more thoroughly below, the apparatus shown in FIG. 10 is used in producing a vault 382 having an inner tank 204 and a concrete outer tank 383.

FIG. 11 depicts the hold-down assembly 272 in an exploded view. The hold-down assembly 272 can be made of a number of materials having the requisite strength and rigidity and is preferably made of steel, although other metals or plastics might be suitable, especially in connection with the production of smaller vaults. The hold-down assembly 272 includes an upper portion 410 and a lower portion 412. The upper portion 410 can be coupled to the form 242 in a fashion similar to that described above in connection with other embodiments, such as using chains 104. The lower portion includes at least one and, preferably, a plurality of pressure distribution members such as beams 412a, 412b, 412c, 412d. Each beam 412a–412d, in the depicted embodiment, includes a channel member 414, end ears 416a, 416b, a bridge member 418, and beam extenders 420a, 420b.

The bridge member 418 has an arched or inverted "V" shape and is positioned within the channel of the channel member 414 and is connected thereto such as by welding. The bridge member 418 acts to distribute forces imposed on the ends of the beam across the span of the beam in a fashion similar to the distribution of forces by an arch along the span of a bridge.

The beam extenders 420a, 420b are connected to devices for engagement with the upper portion 410. In the depicted embodiment, the devices for engagement are screw engagement devices such as nuts 422a, 422b, attached to the extenders 420a, 420b such as by welding.

The upper portion 410 includes devices for engaging with the engagement members 422a, 422b of the lower portion 412 and thereby permitting the lower portion 412 to be coupled to the upper portion and, ultimately, to the form 242. In the depicted embodiment, the upper portion 410 includes at least one and preferably a plurality of hold-down bars 286a, b, c, d.

Although the embodiment depicted in FIGS. 10 and 11 show four hold-down bars 286a, b, c, d and associated strong backs 296a, b, c, d, another embodiment includes only two bars, which provides the advantage of compatability with other form apparatus, such as that depicted in FIG. 4. The bars 286 can be connected together by connecting members 426a, 426b. By connecting the bars 286 with the connecting members 426 it becomes easier to position the beams 412a, 412b, 412c, 412d in a desired configuration such as a planar configuration.

Hold-down extenders 292a–292h, as depicted, are connected to the beams in a rotatable fashion. The lower ends of the hold-down extenders 292 have screw threads corresponding to the threads in the nuts 422. The hold-down extenders 292 are connected to handles 428 for rotating the hold-down extenders 292. Because of the screw engagement of the hold-down extenders 292 with the nuts 422, the hold-down extenders 292 can be releasably coupled to the nuts 422 and thus to the beams 412.

In the depicted embodiment, the hold-down assembly 272 has a manway positioning system connected to it. The depicted manway positioning system includes devices for engaging the manway and coupling the manway to the hold-down assembly 272, and thus to the form 242. The engaging and coupling devices are adjustable to permit positioning the manway 368. A manway cap 432 can be connected to the rim of the manway 368 such as by using screws inserted through a plurality of holes 434. At least one and, preferably, three pivot connections 436a, 436b, 436c, include a device for coupling the cap 432 with adjusting handles 438a, 438b, 438c, such as by pivoting bearings 440a, 440b, 440c. The handles 438a, 438b, 438c include threaded shanks or stems 442 which engage with nuts 444 threaded onto the shanks 442.

Referring again to FIG. 10, in use, the tank 204, preferably a plastic tank, is positioned in the form 242 so as to create a space 54 between the tank 204 and the inner walls of the form 242. In one embodiment, the tank 204 is positioned after a lower layer of concrete is poured, but before it sets. In this way, the entire amount of concrete can be poured before substantial setting of the lower layer of concrete to provide a homogenous concrete envelope, as discussed above in connection with other embodiments. The upper and lower portions of the hold-down assembly are engaged by engaging the screw threads of the hold-down extenders 292 with the nuts 422 and the hold-down assembly 272 is positioned over the tank 204. The ears 416 engage the edges of the tank 204. If corner locators, such as those shown in FIG. 9, are used, they are engaged with the corners of the tank 204. The channels 414 extend across the upper surface of the tank 204.

The extenders 292, 420 are sized and/or adjusted so that the lower surfaces of the beams 412 will contact the upper surface of the tank 204 when the tank is in the desired vertical and lateral position such as with the upper surface of the tank 204 about 6 inches (about 15 cm) below the upper edge 262 of the form 242. Preferably, the hold-down assembly 242 is adjusted in a preferred configuration, such as with the beams 412 substantially planar, before positioning over and in the form 242. The hold-down assembly 272 is connected to the form 242 in a manner similar to that described above in connection with other embodiments.

The manway cap 434 is connected to the manway 368, preferably, before the tank 204 is positioned in the form 242. The manway adjustment system then couples the cap 434 to the hold-down assembly 272 such as by positioning nuts 444 in the recesses 449 and the shanks 442 in the slots 451 of the sockets 448 by pivoting shanks 442 about pivots 436. In this configuration, the faces of the nuts 444 engage the interior of the recesses 449 to prevent nut rotation and the upper and lower surfaces of the nut 444 are restrained from substantial vertical movement. The handles 438a, 438b, 438c are then rotated. Rotation in one direction will result in movement of the shank or stem 442 toward the tank and thus toward the manway resulting in a downward force on the manway 368. Rotation in the other direction will cause the shank or stem 442 to move so as to cause an upward force in a direction away from the tank or the manway. By rotating the handles 438, the manway 368 can be moved so as to place it in a preferred or desired position. In one preferred embodiment, three handles and stems are provided and the manway 368 is positioned so that the upper edge or rim of the manway is level with the plane which will define the upper surface of the concrete 383, as depicted in FIG. 10. Preferably, the manway is positioned while the hold-down device 272 is being used to maintain the vertical and horizontal position of the tank 204. The tank is sufficiently flexible to permit movement of the manway 368 without substantial movement of those portions of the upper surface of the tank 204 contacted by beams 412 away from the surfaces defined by the bottoms of the beams 412.

The tank 204 is at least partly (and, preferably entirely) filled with a gas, such as air. The tank 204 is preferably pressurized, as described above. In one embodiment, the manway lid 434 includes apparatus (not shown) such as a value and a nozzle, for admitting pressurized air into the tank. The space 252 between the tank 204 and the form 242 is filled with concrete. The concrete is at least partly hardenable or settable in a setting period (i.e., the period from pouring of the concrete until it has sufficiently hardened that hold-down pressure can be relieved. The hardness of the concrete increases in time and the exact period when sufficient setting of the concrete has been achieved will vary depending upon the time of concrete used. Sufficient setting of the concrete is achieved when the concrete has bridged the flexible tank and internal pressure of the tank can be released (causing the tank to contract to its normal, unpressurized size) without causing the concrete to collapse, become cracked, or otherwise damaged. Preferably, the concrete, when fully cured, can withstand pressure of about 3,000 psi (about 20 MPa). In one preferred embodiment, the concrete described in Table I is used. This formation, when fully cured, can withstand pressure of about 4,500 psi (about 30 MPa). Many of the concretes which can be used are substantially exothermic during setting and the heat generated during the setting process will, other factors being equal, heat the tank and the gas inside the tank causing an increase in internal pressure on the tank.

TABLE I

| CONCRETE SPECIFICATIONS | |
|---|---|
| $\frac{3}{4}''$ Rock | 1820 lbs. per yard |
| Sand | 1550 lbs. per yard |
| Cement | 611 lbs. per yard |
| Water | 15 gal. per yard (4" slump) |
| 322N* | 5 oz. per 100 wt. |
| 122 HE* | 5 oz. per 100 wt. |
| Micro Air* | 2 oz. per yard |
| Grace Plastizer (WRDA-19)** | 45 oz. per yard |
| Grace Fibers** | 1 lb. per yard |

*Product available from MASTER BUILDERS CO.
**Product available from GRACE CO.

In one embodiment, a setting period of about 12 hours, and up to about 24 hours, is used for the concrete in Table I. However, those skilled in the concrete art will know how to adjust the setting time to achieve the required degree of setting before release of internal tank pressure and/or release of hold-down force. For example, various additives are known for producing faster-setting concrete. Further, it is possible to speed the setting of certain types of concrete using heat, for example, steam heat. As noted, such heat may tend to increase the internal pressure in the tank, requiring adjustment of such pressure. Those skilled in the concrete art will also know how to provide other types of concrete which can be used in connection with forming a fluid containment tank. For example, a lightweight concrete can, in some instances, be used in order to reduce the mass of the finished product. It is believed that lightweight concrete will also provide a higher degree of insulation. On the other hand, lightweight concrete is, in general, a more porous and provides a higher potential for leakage.

As the concrete is inserted, while it is in the fluid state, there will be a tendency for the tank 204 to bob or to be buoyed up by the concrete, in response to an upward, buoyancy force on the tank. This upward force is countered by a downward force provided by the hold-down assembly 272. The downward force is distributed across a region of the tank by vertical restraint members such as the beams 412, controlling ballooning of the tank which would otherwise occur and avoiding damage to the tank which could result from concentration of hold-down pressure over a small region. The beams have sufficient rigidity to distribute the hold-down force over an area greater than the cross-sectional area of the extenders 292, 420.

After the concrete has sufficiently set, the manway is freed of the manway adjustment system (such as by rotating the handle 438 to loosen the structure and slipping the nuts 444 and stems 442 out of the sockets 448) and the embedded beams 412 are decoupled from the upper portion of the hold-down assembly 272 such as by rotating handles 428 to unscrew the hold-down extenders 292 from the nuts 422. The upper portion of the hold-down assembly 272 is removed and the vault 382 is taken out of the form 242. Preferably, the holes in the concrete, left after removal of the hold-down extenders 292, are patched such as by filling with concrete.

In light of the above-description, a number of advantages of the present invention can be seen. The present invention permits entombment of a plastic inner tank in a concrete outer tank without use of an external framework despite flexibility of the tank. The present invention permits adjusting the tank manway upward or downward to a desired position without moving the remaining portion of the tank away from the desired vertical position. The present invention facilitates levelling of the tank by permitting the beams 412 to be positioned in a planar fashion before positioning over the form. By leaving the beams 412 embedded in the set concrete, a longer setting period can be used and it is believed the embedded beams help withstand pressure forces after the concrete is set.

Modification and variation can be made to the disclosed embodiments without departing from the subject of the invention. The vertical restraint device can position the tank within the form without being coupled to the outside of the form such as by using one or more straps or cables running over the upper surface of the tank, vertically through space 54 and, thereafter, coupled to the forms such as by being coupled to the side or bottom of the form. In this configuration the strap or cable can be left in place, at least partially embedded in the concrete. The vault can include a third layer of containment such as by providing a double-walled tank 204. Manway 368 or other access devices can be positioned on a side surface or bottom surface. The manway adjustment system can have more or fewer than three shanks or handles, and can be releasably coupled to the hold-down by devices other than sockets 448, such as using welded nuts and a releasable contention to the lid 434. The hold-down assembly can be indirectly coupled to the form such as by being connected to a wall or floor of a building which houses the form. Downward pressure on the hold-down device can be achieved by mechanisms other than a chain and ratchet, including electric and hydraulic pressure devices. The hold-down system can include more or fewer members which can be positioned in other configurations such as diagonally or with a curved configuration. The embedded portion of the hold-down assembly can be separated from the upper portion by means other than unscrewing, such as by sockets, telescoping connectors, snap catches, cutting (e.g. cutting level with the top of the concrete) and the like. The pressure distribution devices can be devices other than the depicted beams such as plates, provided the contact portion (which typically will become embedded in concrete) distributes force over a sufficiently large area that damage to the tank from excessive pressure is avoided. For example, a number, such as about 20, of hold-down tubes 92 can be provided, each with an embeddable plate as a foot for contacting the tank. If desired, non-flammable liquids can be stored in vault 2. Although it is preferred to include rebar cage 52 as a part of outer tank 8, one need not necessarily do so. Inner tank 4, although in the preferred embodiment made of steel, could be made of other suitable material according to the particular liquid being contained and the environment. It is preferred that vault 2 have a flat bottom for stability. However, other shapes are also possible. Vertical force can be applied to inner tank 4 during curing of the concrete in ways not shown. For example, tubes 92 could be replaced by I-beams permanently mounted to inner tank 4 and left within concrete top 120. Also, by appropriately positioning fill and vent pipes 16, the tops of these pipes may be used to apply the necessary vertical force on inner tank 4 to keep the inner tank from floating before the concrete has set. Other methods and apparatus could be used to assure that the enveloping concrete is homogeneous. The concrete could be inserted with a single pour, relying on buoyancy to position needed concrete underneath the tank. Concrete could be inserted through openings in the side of the form. Concrete could be put in the form first and the tank forced down to squeeze concrete up and around the edges and top of the tank. One or both of chain binders 80 and chain ratchets 110 may be replaced by other suitable tightening devices, such as hydraulic push-pull jacks. The chain can be replaced by other structures such as a cable, a strap, or a rope. Many different configurations of centering frame 154 could be used as well. Additional framework members could be used with external framework 154, such as between upper horizontal members 156 and between lower horizontal members 158. Plastic tank 152 could be made of other non-metallic materials including fiberglass, ceramic or composite materials.

Although the invention has been described by way of preferred embodiments and variations and modifications thereof, other variations and modifications can also be used, the invention being defined by the following claims.

What is claimed is:

1. An apparatus for positioning a manway opening, in a device for entombing an inner tank in concrete, the device including a form for holding a layer of concrete in a region surrounding said tank while said concrete at least partially sets, and a vertical restraint device to counteract buoyant forces on the tank caused by buoyancy of the tank with respect to concrete, the tank including a manway with an opening having a top edge, the apparatus being separate from said vertical restraint, the apparatus being an apparatus for positioning the manway opening of the tank during at least partial setting of the concrete, the apparatus comprising:

at least a first shank, coupled to said form;

a coupler, releasably attaching said shank to the top edge of the manway opening so that movement of said shank in a direction toward said tank exerts a force on said manway which has a downward component and movement of said shank in a direction away from said tank exerts a force on said manway which has an upward component, a shank movement device that provides movement of said shank such that said coupler exerts a force on said manway having an upward or downward component to position the upper edge of the manway in a desired location wherein said coupler includes a plate positioned over said manway and attached to the edge of said manway.

2. In a device for entombing an inner tank in concrete, the device including a form for holding a layer of concrete in a region surrounding said tank while said concrete at least partially sets, and a vertical restraint device to counteract buoyant forces on the tank caused by buoyancy of the tank with respect to concrete, the tank including a manway with an opening having a top edge, apparatus, separate from said vertical restraint, for positioning the manway opening of the tank during at least partial setting of the concrete, the apparatus comprising:

at least a first shank, coupled to said form;

a coupler, connecting said shank to the top edge of the manway opening so that movement of said shank in a direction toward said tank exerts a force on said manway which has a downward component and movement of said shank in a direction away from said tank exerts a force on said manway which has an upward component, a shank movement device that provides movement of said shank such that said coupler exerts a force on said manway having an upward or downward component to position the upper edge of the manway in a desired location;

wherein said coupler includes a connector for connecting said shank to said coupler to permit pivoting of said shank with respect to said coupler.

* * * * *